(12) United States Patent
Takayanagi

(10) Patent No.: US 11,104,106 B2
(45) Date of Patent: Aug. 31, 2021

(54) GARMENT

(71) Applicant: Toray Industries, Inc., Tokyo (JP)

(72) Inventor: Hajime Takayanagi, Osaka (JP)

(73) Assignee: Toray Industries, Inc., Tokyo (JP)

(*) Notice: Subject to any disclaimer, the term of this patent is extended or adjusted under 35 U.S.C. 154(b) by 191 days.

(21) Appl. No.: 15/779,118

(22) PCT Filed: Nov. 30, 2016

(86) PCT No.: PCT/JP2016/085503
§ 371 (c)(1),
(2) Date: May 25, 2018

(87) PCT Pub. No.: WO2017/094757
PCT Pub. Date: Jun. 8, 2017

(65) Prior Publication Data
US 2018/0343943 A1 Dec. 6, 2018

(30) Foreign Application Priority Data
Dec. 3, 2015 (JP) .............................. JP2015-237016

(51) Int. Cl.
*B32B 25/14* (2006.01)
*A41D 31/102* (2019.01)
(Continued)

(52) U.S. Cl.
CPC ............ *B32B 25/14* (2013.01); *A41D 31/065* (2019.02); *A41D 31/102* (2019.02);
(Continued)

(58) Field of Classification Search
CPC ............ A41D 2500/20; A41D 31/0038; A41D 31/065; A41D 31/102; B32B 2307/304;
(Continued)

(56) References Cited

U.S. PATENT DOCUMENTS 3,240,656 A * 3/1966 Faircloth ................ D03D 11/00
428/175
5,249,323 A 10/1993 Kikuchi et al.
(Continued)

FOREIGN PATENT DOCUMENTS

CN 102599663 A 7/2012
CN 103879108 A 6/2014
(Continued)

OTHER PUBLICATIONS

The First Office Action dated May 20, 2019, of counterpart Chinese Application No. 201680070282.X, along with an English translation.
(Continued)

*Primary Examiner* — Arti Singh-Pandey
(74) *Attorney, Agent, or Firm* — DLA Piper LLP (US)

(57) ABSTRACT

A garment has an excellent feel as well as cold protective properties and waterproof breathable performance. The garment includes a multi-layer woven fabric comprising a face-side fabric, a back-side fabric, a filling packed between the face-side fabric and the back-side fabric, and a waterproof breathable membrane, the face-side fabric and the back-side fabric being woven together to form the multi-layer woven fabric, the waterproof breathable membrane being provided on one surface of the multi-layer woven fabric.

10 Claims, 3 Drawing Sheets

(51) Int. Cl.
*D03D 11/00* (2006.01)
*A41D 31/06* (2019.01)
*B32B 5/02* (2006.01)
*B32B 5/26* (2006.01)
*D03D 15/00* (2021.01)
*A41D 31/18* (2019.01)

(52) U.S. Cl.
CPC .............. *A41D 31/185* (2019.02); *B32B 5/02* (2013.01); *B32B 5/26* (2013.01); *D03D 11/00* (2013.01); *D03D 15/00* (2013.01); *A41D 2500/20* (2013.01); *B32B 5/024* (2013.01); *B32B 2307/304* (2013.01); *B32B 2307/724* (2013.01); *B32B 2307/726* (2013.01); *B32B 2307/728* (2013.01); *B32B 2437/00* (2013.01)

(58) Field of Classification Search
CPC ........ B32B 2307/724; B32B 2307/726; B32B 2307/728; B32B 2437/00; B32B 5/02; B32B 5/024; B32B 5/26
See application file for complete search history.

(56) References Cited

U.S. PATENT DOCUMENTS

| | | | |
|---|---|---|---|
| 5,459,895 A | 10/1995 | Kikuchi et al. | |
| 2008/0042414 A1* | 2/2008 | Nagaoka | B60R 21/235 280/743.1 |
| 2011/0119811 A1* | 5/2011 | Rock | B32B 5/02 2/243.1 |
| 2014/0356574 A1 | 12/2014 | Conolly et al. | |
| 2016/0242475 A1* | 8/2016 | Uozumi | D06P 1/0012 |
| 2017/0172240 A1* | 6/2017 | Massey | B32B 7/05 |
| 2018/0014584 A1* | 1/2018 | Kai | A41D 31/065 |
| 2019/0297974 A1* | 10/2019 | Takayanagi | D03D 1/00 |

FOREIGN PATENT DOCUMENTS

| | | |
|---|---|---|
| CN | 204519455 U | 8/2015 |
| JP | 61-75806 A | 4/1986 |
| JP | 63-110507 U | 7/1988 |
| JP | 05-042029 A | 2/1993 |
| JP | 05-103712 A | 4/1993 |
| JP | 10-234547 A | 9/1998 |
| JP | 2004-155113 A | 6/2004 |
| JP | 2005-194649 A | 7/2005 |
| JP | 2008-231585 A | 10/2008 |
| JP | 2015-001025 A | 1/2015 |

OTHER PUBLICATIONS

The Extended European Search Report dated Oct. 24, 2019, of counterpart European Application No. 16870694.3.

Tang Maoyi, et al., *Theory and Practice of Enterprise Management Strategy*, Enterprise Management Press, 1986.09, p. 200, along with an English translation.

Third Office Action dated Jun. 5, 2020, of counterpart Chinese Application No. 201680070282.X, along with an English translation.

Zhongming Lu, "The Money-Making Secretin Garment Business", p. 203, Donghua University Press, Oct. 2015, along with an English summary.

* cited by examiner

GARMENT

TECHNICAL FIELD

This disclosure relates to a garment made of a multi-layer woven fabric, in particular, a garment made of a multi-layer woven fabric having excellent moisture permeability and waterproof performance.

BACKGROUND

Quilting stitches are sewn in various types of garments such as down jackets, down vests, and skiwear filled with synthetic fibers to prevent the filling (such as down) from shifting. However, quilting inevitably produces seams on the garment fabric, and warm air retained in the garment escapes through the seams. Another drawback is that the filling such as down and synthetic fibers comes out of the seams. Yet another drawback is that rainwater may easily enter through the needle holes on the quilted fabric.

A method of preventing down from shifting by using small bags to pack the down has been proposed (JP H5-103712 A) to solve the above problems. That method, however, adversely affects the feel of down.

Other methods have also been proposed, including a method in which small compartments for packing down or the like are created by providing fabric partition walls of which one end is fixed to an adhesive surface of a top fabric and the other end is fixed to an adhesive surface of a bottom fabric (JP H5-42029 A); and a method in which a plurality of small compartments are created by forming a grid by crossing strip members containing a main gore and an adhesive layer and bonding the strip members with each other, and then attaching the grid to top and bottom fabrics via the adhesive layer of the strip members (JP H10-234547 A). The fabric products produced by those methods, however, have a stiff feel. Another drawback of those methods is that, when a physical force is applied to the surface material, the fabric product does not conform to the deformation and, due to this, the comfort of wearing is reduced.

The fabric products of JP '712, JP '029 and JP '547 also lack sufficient waterproofness or breathability.

It could therefore be helpful to provide a garment having an excellent feel as well as cold protective properties and waterproof breathable performance.

SUMMARY

We thus provide:
(1) A garment comprising a multi-layer woven fabric comprising a face-side fabric, a back-side fabric, a filling packed between the face-side fabric and the back-side fabric, and a waterproof breathable membrane,
the face-side fabric and the back-side fabric being woven together to form the multi-layer woven fabric,
the waterproof breathable membrane being provided on one surface of the multi-layer woven fabric.
(2) The garment according to the above (1), which has a synthetic resin membrane on the other surface of the multi-layer woven fabric.
(3) The garment according to the above (1), wherein the multi-layer woven fabric comprises a plurality of compartments.
(4) The garment according to any one of the above (1) to (3), wherein the multi-layer woven fabric having the waterproof breathable membrane has an air permeability of 5 cc/cm²·sec or less.
(5) The garment according to any one of the above (1) to (4), wherein the multi-layer woven fabric having the waterproof breathable membrane has a water pressure resistance of 300 mm $H_2O$ or more.

Our garment has no seams, and therefore the garment prevents warm air trapped therein from escaping to the outside and thus achieves excellent cold protective properties. Also due to the absence of seams, the garment prevents ambient air from easily entering into the garment and also exerts excellent waterproof performance. The garment also has an excellent feel due to the filling packed between the face-side fabric and the back-side fabric. The garment further has excellent waterproof breathable performance due to a waterproof breathable membrane provided on one surface of the multi-layer woven fabric. The garment further effectively prevents the filling between the face-side fabric and the back-side fabric from easily coming out of the garment, due to a synthetic resin membrane provided on the other surface of the multi-layer woven fabric.

REFERENCE SIGNS LIST

Figure 1:
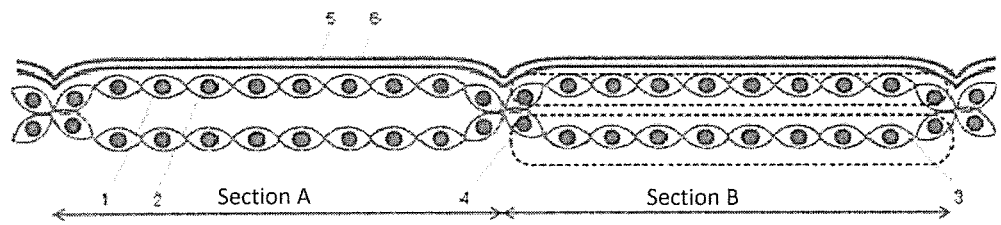
FIG. 1 is a sectional view of an example of a three-layer laminate containing a face fabric, a waterproof breathable membrane, and a double woven fabric (a double woven fabric having a waterproof breathable membrane on one surface).

1 Warp threads
2 Weft threads
3 Face-side fabric
4 Back-side fabric
5 Waterproof breathable membrane
6 Face fabric
7 Synthetic resin membrane
8 Lining fabric
10 Down jacket

DETAILED DESCRIPTION

Multi-Layer Woven Fabric

Figure 6:
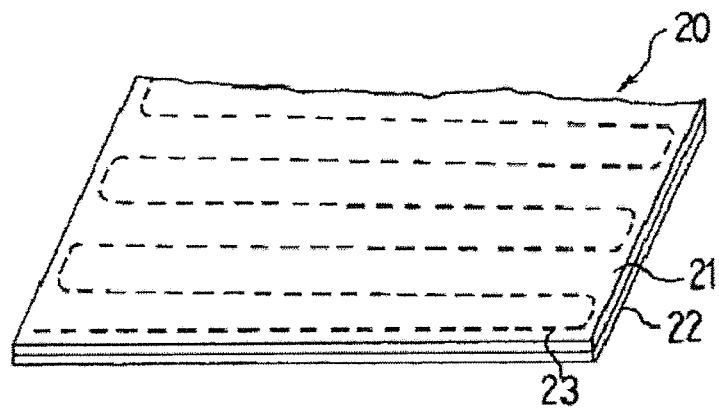
FIG. 6 is a perspective view of a conventional multi-layer woven fabric.

A common multi-layer woven fabric will be described below for deeper understanding. A common multi-layer woven fabric is produced by, for example, weaving two unit woven fabrics 21 and 22 by interlacing warp and weft threads, then stacking the two fabric sheets on top of another to serve as face and back fabrics, and binding the fabric sheets together with a binding yarn 23, as shown in FIG. 6. The multi-layer woven fabric 20 is easy to produce by weaving on a loom, and widely used as a fabric to produce, for example, garments and garment accessories such as belts, coats, jackets, trousers and bags.

Figure 7:
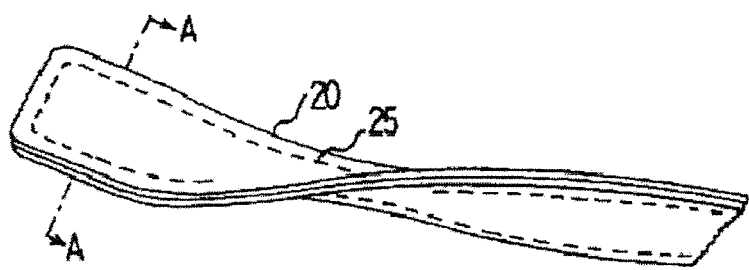
FIG. 7 is a perspective view of a garment accessory made of a conventional multi-layer woven fabric.
Figure 8:
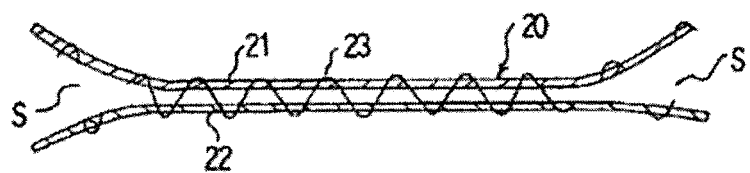
FIG. 8 is a sectional view showing a process for producing selvages on the garment accessory of FIG. 7.
Figure 9:
FIG. 9 is a sectional view showing a process for producing selvages on the garment accessory of FIG. 7.

In an exemplary production process of a belt from the multi-layer woven fabric 20, the multi-layer woven fabric 20 serving as a garment fabric is cut into a predetermined shape as shown in FIG. 7. Then, the edges of the multi-layer woven fabric 20 are opened to separate the unit woven fabrics 21 and 22, as shown in FIG. 8. The binding yarn 23 exposed on the edges of the fabric 20 is cut (S) with scissors, a knife or the like. The waste thread is removed. Then, the edges of the unit woven fabrics 21 and 22 are folded to the inside as shown in FIG. 9, and pressed with an iron to create selvages 24. The folded edges serving as selvages 24 are sewn with a sewing thread 25.

In the multi-layer woven fabric 20 as shown in FIG. 6, the binding yarn 23 is interlaced into the unit woven fabrics 21 and 22 with very strong tension in the machine weaving process of the multi-layer woven fabric 20. Consequently, the volume of the air layer between the layered parts of the unit woven fabrics 21 and 22 is small, which cannot achieve good heat retaining properties or bulkiness. The multi-layer woven fabric 20 also has the above-mentioned drawbacks due to the seams stitched with the binding yarn 23. Also due to the seams, the multi-layer woven fabric 20 has poor waterproof breathable performance, which performance prevents entry of rainwater or water but allows the permeation of moisture (water vapor).

We found that these problems are solved by providing a multi-layer woven fabric that contains no seams and has a waterproof breathable membrane on one surface of the fabric.

Weave that Produces Face-Side Fabric and Back-Side Fabric of Our Garment

The weave that produces the face-side fabric and the back-side fabric of our garment includes, for example, plain weave in which "each weft thread passes alternately over and under a warp thread and each warp thread passes alternately over and under a weft thread," twill weave in which "each weft thread does not pass alternately over and under a warp thread or vice versa, but each weft thread passes over one warp thread and then passes under two warp threads (1×2 twill), or each weft thread passes over one warp thread and then passes under three warp threads (1×3 twill)," satin weave in which "there are a small number of floats of weft threads and only warp threads appear to lie on the surface and therefore the fabric has a glossy surface," solidly covered weave that "uses colored threads to weave a background design on another type of weave such as a plain or satin weave," high density weave that "is the most suitable for and capable of reproducing fine detail that ordinary weave cannot produce such as an intricate artwork or small texts due to use of a special type of yarn or a high yarn density,", shrink resistant weave that "resists shrinkage and distortion," and crepe weave that "produces a rough, dull surface like the skin of a pear," or the like. Of these, preferred is plain weave having more interlaced threads compared to other types of weave and is therefore strong although thin as a fabric.

Filling Packed Between the Face-Side Fabric and the Back-Side Fabric of Our Garment The filling packed between the face-side fabric and the back-side fabric of the garment may be, for example, down, feather, cotton, polyester and the like. Preferred are staple fibers of polyester such as polyethylene terephthalate, with a single fiber fineness of 0.1 to 5.0 dtex. Such polyester staple fibers have excellent heat retaining properties. The weight per area of the filling is preferably 50 to 500 $g/m^2$ for excellent heat retaining properties.

Structural Fibers of the Face-Side Fabric and the Back-Side Fabric of Our Garment The face-side fabric and the back-side fabric of the garment may be produced by interlacing multifilament yarns. Multifilament yarns are comprised of a plurality of monofilaments. To provide a certain amount of strength to the fabric to be produced, the fineness of the multifilament yarns is preferably 3 dtex or more, more preferably 5 dtex or more, further more preferably 7 dtex or more. Preferably, the fineness of the multifilament yarns is 25 dtex or less, more preferably 16 dtex or less, further more preferably 12 dtex or less. The multifilament yarns with a fineness in the above range can be used to produce a lightweight thin fabric with a predetermined strength.

The strength at break of the multifilament yarns is preferably 3.5 cN/dtex or more, more preferably 4.5 cN/dtex or more, and is preferably 10 cN/dtex or less, more preferably 6 cN/dtex or less. The multifilament yarns with strength at break in the above range can be used to produce a fabric with adequate tear strength, even when the multifilament yarns are composed of filaments having a highly flat shape.

The elongation at break of the multifilament yarns is preferably 35% or more and is preferably 50% or less. If a certain force is applied to the face-side fabric or back-side fabric made of multifilament yarns having an elongation at break of less than 35%, the stress corresponding to the force may concentrate on a single monofilament and, as a result, the fabric may be easily torn. On the other hand, if the elongation at break is over 50%, the multifilament yarns just after spinning are elongated under strong tension due to friction between the yarns and the spinning machine, and the yarns may be easy to break.

The monofilaments that form the multifilament yarns will be specifically described below.

The fineness of the monofilaments is preferably 0.5 dtex or more, more preferably 1.0 dtex or more, and is preferably 3.0 dtex or less, more preferably 2.5 dtex or less. The monofilaments with a fineness in the above range can be used to produce a fabric having appropriate tear strength and low air permeability.

The multifilament yarns and the monofilaments may be various types made of synthetic fibers such as nylon fibers and polyester fibers. Polyester fibers are preferred to achieve high strength and dimensional stability. Examples of the polyester fibers include polyethylene terephthalate fibers, polybutylene terephthalate fibers and the like. The polyester fibers may be copolymerized polyester fibers produced by copolymerizing polyethylene terephthalate or polybutylene terephthalate with an acid component, for example, isophthalic acid, sodium 5-sulfoisophthalate, or an aliphatic dicarboxylic acid such as adipic acid. The fibers contained in the multifilament yarns may be a single type or an appropriate combination of different types of fibers.

Multi-Layer Woven Fabric Containing a Plurality of Compartments

To produce the multi-layer woven fabric containing a plurality of compartments by weaving the face-side fabric and the back-side fabric, the weaving can be a so-called hollow weave that can produce a hollow woven fabric in which two fabric layers are joined at the selvage ends. The size of the area of the individual compartments should be suitable to accommodate an appropriate volume of the filling packed between the face-side fabric and the back-side fabric so that a soft feel is achieved. Hence, the area is preferably 1 inch$^2$ or more. The loom that can be used to produce the hollow woven fabric is, for example, an air-jet loom, a water-jet loom, a rapier loom or the like. The shedding device that can be used is, for example, a Dobby shedding device, a jacquard shedding device or the like. The multi-layer woven fabric has at least two layers, i.e., the face-side fabric and the back-side fabric, but the structure of the multi-layer woven fabric is not limited thereto. The multi-layer woven fabric may have three or more layers depending on the purpose of use.

Air Permeability of Multi-Layer Woven Fabric

The air permeability of the multi-layer woven fabric is, when measured by the Frazier tester method, preferably 5 cc/cm$^2$·sec or less and is preferably 0.1 cc/cm$^2$·sec or more. The multi-layer woven fabric having air permeability in this range prevents escape of the filling packed between the face-side fabric and the back-side fabric.

Water Pressure Resistance of Multi-Layer Woven Fabric

The multi-layer woven fabric having the fabric surface and the woven part preferably has a water pressure resistance of 300 mm H$_2$O or more to prevent water infiltration. Water repellent finish can be applied to the surface of the garment made of the multi-layer woven fabric. The water repellent may be a common water repellent finishing agent for fibers. The water repellent suitable for the garment is, for example, a silicone-based water repellent, a fluorine-based water repellent made of a polymer having a perfluoroalkyl group, or a paraffin-based water repellent. Of these, a fluorine-based water repellent is particularly preferred because the refractive index of the coating is low, leading to a small reflection of light on the fiber surface. The water repellent finish may be done by common methods such as the padding method, the spray method, the printing method, the coating method, and the gravure method.

Fibers

The waterproof breathable membrane has low wear durability and is therefore preferably not exposed to the face of the garment. Accordingly, a face fabric is preferably provided on the surface of the waterproof breathable membrane. The face fabric provided on the waterproof breathable membrane may be a woven fabric made of fibers, and the fibers may be a single type or a combination of two or more types of fibers, including polyester fibers such as polyethylene terephthalate and polytrimethylene terephthalate; synthetic fibers such as polyamide fibers, for example, Nylon 6 and Nylon 66; semi-synthetic fibers such as acetate fibers; and natural fibers such as cotton, hemp, and wool. Typically, a waterproof breathable woven fabric is treated with water repellent finish and, therefore, preferred are filaments of synthetic fibers that are easy to treat with durable water repellent finish such as polyester fibers and nylon fibers. The cross-sectional shape of the fibers is not particularly limited and may be various types of shapes such as a round shape, a triangle shape and a hollow shape. Further, an additive that imparts antistatic properties or the like or a delustering agent such as titanium oxide may be contained in the threads.

To improve moisture permeability, the fibers used to form the woven fabric serving as the face fabric preferably have low moisture absorption. Moisture migrates due to the driving force resulting from the difference in the water vapor pressure between the high humidity side of the waterproof breathable membrane and the low humidity side of the waterproof breathable membrane. Hence, a larger difference in the water vapor pressure will result in a larger amount of moisture permeation. When the multi-layer woven fabric is used to form a garment or the like, the surface of the waterproof breathable membrane is typically present on the high humidity side and the woven surface of the face fabric is present on the low humidity side in the garment. If a woven fabric made of fibers with high moisture absorption is used as the face fabric, the woven fabric contains moisture and the local water vapor pressure on the low humidity side increases. As a result, the difference in the water vapor pressure that contributes to water vapor migration from the surface of the waterproof breathable membrane to the woven surface, may be small, and in turn the amount of moisture permeation may decrease. That is, lower moisture absorption of the woven fabric serving as the face fabric will result in higher moisture permeability. When a woven fabric is used as the face fabric, the moisture absorption of the woven fabric is preferably 1% or less, more preferably 0.5% or less. Accordingly, the fibers used to form the woven fabric are preferably filaments of polyester fibers or polypropylene fibers and, in terms of dyeability, filaments of polyester fibers are more preferred.

The moisture permeability of a garment is inversely proportional to the thickness of the garment, and thus the moisture permeability is higher when the garment is thinner. This is because when the garment is thinner, the distance that water vapor migrates is shorter, and thus the moisture permeability is higher. The thickness of the garment fabric is preferably 0.2 mm or less. Such a thin garment having waterproof breathable performance can be produced by using, for example, (1) a thin woven fabric, (2) a thin waterproof breathable membrane and/or (3) a thin adhesive layer for lamination when the garment is laminated.

Typically, a woven fabric can be made thin by using a yarn with a small fineness. Accordingly, the total fineness of the yarn used to form the woven fabric is preferably 77 dtex or less, more preferably 55 dtex or less. However, if the yarn is excessively thin, the tear strength will be small, and thus the total fineness of the yarn is preferably 11 dtex or more. When a fine yarn is required in accordance with the purpose of use, the woven fabric may be produced by ripstop weave or the like, in which a thick yarn or a set of fine yarns arranged in parallel is interwoven at several regular intervals, thereby providing a thin woven fabric having high tear strength. The weave is not particularly limited and may be plain weave, twill weave, satin weave, modified weave, or the like. However, since a thin woven fabric is required, plain weave is preferred.

Waterproof Breathable Membrane

The waterproof breathable membrane is made of a resin, and examples of the resin include polyurethane resins such as polyester-based polyurethane copolymers, polyether-based polyurethane copolymers, and polycarbonate-based polyurethane copolymers; polyurethane resins prepared by copolymerization with silicone, fluorine, an amino acid or the like; acrylic resins; synthetic rubbers; vinyl resins such as polyvinyl chloride or the like. Moisture permeability can be imparted by providing, for example, (1) a moisture permeable nonporous membrane whose principal component is urethane, (2) a microporous membrane whose principal component is urethane, (3) a microporous membrane whose principal component is polytetrafluoroethylene, or the like. Of these, (1) a moisture permeable nonporous membrane whose principal component is urethane is preferred because such a nonporous membrane can retain waterproof performance even when made thin. Such a moisture permeable nonporous membrane can be stacked on a microporous membrane as described in the above (2) and (3).

The moisture permeable nonporous membrane whose principal component is urethane preferably further contains a hydrophilic polyol such as polyethylene glycol and polypropylene glycol, for higher moisture permeability. The amount of the hydrophilic polyol contained in the nonporous membrane is preferably 10% by weight to 50% by weight. The nonporous membrane is particularly preferably made of a polyurethane containing an aliphatic carbonate diol in the backbone to achieve adequate membrane strength. Also preferred is a polyurethane in which most of hydrophilic polyol units are present in the side chains rather than the backbone. Such a resin is diluted in an organic solvent such as methyl ethyl ketone, dimethylformamide, and toluene, and applied to a release paper and dried to give a nonporous membrane.

The microporous membrane whose principal component is urethane can be produced by dissolving a polyurethane resin in dimethylformamide, applying the polyurethane solution to a fabric, and forming a gel from the solution by the wet gelation method.

The microporous membrane whose principal component is polytetrafluoroethylene can be produced by extruding a tetrafluoroethylene polymer having a crystallinity of about 95% or more according to the paste extrusion process, drying the extruded polymer at a temperature higher than the evaporation temperature of a liquid lubricant contained in the polymer and lower than the crystalline melting point of the polymer to remove the liquid lubricant from the polymer, and stretching the polymer at a temperature lower than the crystalline melting point of the polymer in one or more directions.

A synthetic resin membrane is preferably stacked on the other surface of the multi-layer woven fabric. The synthetic resin membrane has an excellent effect of preventing the filling packed between the face-side fabric and the back-side fabric from coming out of the garment.

The synthetic resin membrane may be a resin film laminated on the fabric with an adhesive or a resin coating.

The synthetic resin membrane is, for example, a microporous membrane, a nonporous membrane, or a microporous membrane layered with a nonporous membrane, and these membranes are made of, for example, a polyethylene terephthalate resin, a polypropylene resin, a polyethylene resin, a polyurethane resin, a polyester resin, a polyamide resin or the like. Of these, preferred are a microporous membrane or a nonporous membrane whose principal component is polyurethane, and a layered membrane composed of a microporous membrane whose principal component is polyurethane and a nonporous membrane whose principal component is polyurethane. Such a membrane has stretchability and therefore does not affect the stretchability of an elastic fabric stacked thereon. An exemplary method of producing the microporous membrane is the so-called wet coagulation method of producing a polyurethane microporous membrane, and the method involving dissolving a polyurethane resin in dimethylformamide, applying the solution to a fabric with a knife-over-roll coater, introducing the fabric in water to allow for coagulation, and drying the fabric.

An exemplary method of producing the nonporous membrane involves dissolving a polyether-based polyurethane resin containing isocyanate groups from xylylene diisocyanate and polytetramethylene glycol units in the soft segment in a mixed solvent of dimethylformamide and methyl ethyl ketone to prepare a polyurethane resin solution, adding hexamethylene diisocyanate with a cyanuric skeleton as a cross linking agent to the polyurethane resin solution to prepare a coating liquid, applying the coating liquid to a fabric with a knife coater or the like, and drying the fabric.

The layered membrane composed of a microporous membrane and a nonporous membrane can be produced by preparing a polyurethane microporous membrane on a fabric by the wet coagulation method as described above, applying a coating liquid to form a nonporous membrane as described above to the surface of the microporous membrane with a knife-over-roll coater or the like, and drying the fabric.

Production Method of Garment

An exemplary method of producing our garment will be described below.

A waterproof breathable membrane can be produced on a release paper as follows. A silicone-coated release paper is coated with an organic solvent solution whose principal component is urethane containing from 10 to 50% by weight of a hydrophilic polyol such as polyethylene glycol and polypropylene glycol, using a knife-over-roll coater or a floating roll coater so that a desired thickness is obtained. Then, the coated paper is dried to give a waterproof breathable membrane. The solution for producing the membrane may further contain, as appropriate, a cross linking agent such as a polyisocyanate compound and a polyepoxy compound, to enhance bonding strength, solvent resistance, and membrane strength.

When coloring of the resin layer is desired, an inorganic or organic pigment or the like can be appropriately added to the resin. When the change of the surface texture of the membrane is desired, small particles such as silicon dioxide and titanium oxide, can be appropriately added to the resin.

Then, the membrane is coated with an adhesive with a gravure roll coater or the like. The adhesive may be an organic solvent solution of a homopolymer resin such as a resin whose principal component is a polyurethane resin, a polyester resin, a polyamide resin, a silicone resin, or the like, or an organic solvent solution of a mixture of the above resins. In this process, the thickness of the coating resin, the percentage of coating area, the type of the resin or the like need to be taken into consideration to achieve moisture permeability and appropriate texture.

The percentage of coating area may be 100% to achieve whole surface bonding as long as a highly moisture permeable resin is used, but typically the percentage of coating area is preferably 40 to 80% to achieve adequate moisture permeability and bonding strength.

The thickness of the coating resin is preferably about 2 to 20 μm to achieve adequate bonding strength and moisture permeability. The resin is preferably a polyurethane-based resin due to ease of processing. The adhesive lamination process may be wet lamination process or dry lamination process, and the type of adhesive lamination process may be selected as appropriate depending on the characteristics of the adhesive.

Then, a face fabric is stacked on top of the adhesive and compressed to bond together. The release paper is then removed to provide a waterproof breathable membrane of which one surface has the face fabric stacked thereon. Then, the adhesive is applied to the other surface of the waterproof breathable membrane, and a multi-layer woven fabric as described later is stacked on top of the adhesive and compressed to bond together to provide a garment material in which one surface of the multi-layer woven fabric has the waterproof breathable membrane.

Besides the adhesive lamination method as described above, a coating method can also be used. In a process of making a waterproof breathable membrane layered on the woven fabric by a coating method, a resin solution is applied to a water repellent finish woven fabric with a knife-over-roll coater or the like. Then, when wet process is used, the resin-coated fabric is introduced into water to coagulate the resin and is then dried. When dry process is used, the resin-coated fabric is directly subjected to drying.

The thus produced garment material in which one surface of the multi-layer woven fabric has the waterproof breathable membrane may further contain a synthetic resin membrane layered on the other surface of the fabric. The synthetic resin membrane may be stacked by the lamination method or the coating method as described above.

The garment has excellent moisture permeability and waterproof performance and, therefore, is suitable as outdoor sports clothing for skiing, skating, snowboarding, and fitness trail exercises, cold weather clothing, working clothing, and daily clothing.

Sectional Views and Weave Diagrams of the Multi-Layer Woven Fabric

Figure 2:
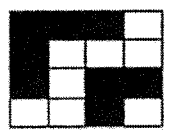
FIG. 2 is a weave diagram of section A of the double woven fabric of FIG. 1.
Figure 3:
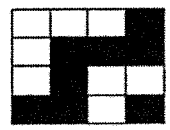
FIG. 3 is a weave diagram of section B of the double woven fabric of FIG. 1.

FIG. 1 is a sectional view of an example of a three-layer laminate containing a face fabric, a waterproof breathable membrane, and a double woven fabric (a double woven fabric having a waterproof breathable membrane on one surface). FIG. 2 is a weave diagram of section A of the double woven fabric of FIG. 1. FIG. 3 is a weave diagram of section B of the double woven fabric of FIG. 1. In the weave diagrams, the black square means that the warp yarn is over the weft yarn, and the white square means that the weft yarn is over the warp yarn. In FIG. 1, the reference numerals denote the following: 1: the warp threads of the double woven fabric; 2: the weft threads of the double woven fabric; 3: the face-side fabric of the double woven fabric; 4: the back-side fabric of the double woven fabric; 5: the waterproof breathable membrane; 6: the face fabric of the three-layer laminate.

Figure 4:
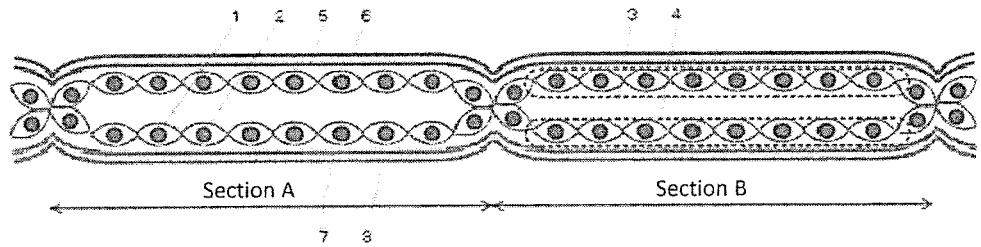
FIG. 4 is a sectional view of an example of a four-layer laminate containing a face fabric, a waterproof breathable membrane, a double woven fabric, a synthetic resin membrane, and a lining fabric (a double woven fabric having a waterproof breathable membrane on one surface and having a synthetic resin membrane on the other surface).

FIG. 4 is a sectional view of an example of a four-layer laminate containing a face fabric, a waterproof breathable membrane, a double woven fabric, a synthetic resin membrane, and a lining fabric (a double woven fabric having a waterproof breathable membrane on one surface and having a synthetic resin membrane on the other surface). The weave diagram of section A of the double woven fabric of FIG. 4 is the same as that shown in FIG. 2. The weave diagram of section B of the double woven fabric of FIG. 4 is the same as that shown in FIG. 3. In FIG. 4, the reference numerals denote the following: 1: the warp threads of the double woven fabric; 2: the weft threads of the double woven fabric; 3: the face-side fabric of the double woven fabric; 4: the back-side fabric of the double woven fabric; 5: the waterproof breathable membrane; 6: the face fabric of the four-layer laminate; 7: a synthetic resin membrane, 8: a lining fabric of the four-layer laminate. As shown in FIGS. 1 and 4, preferably the warps or the wefts are interchanged or switched from one layer to another layer to prevent formation of a gap due to design breakage in the face-side fabric or the back-side fabric. By using different color yarns for the warps and/or wefts to produce the multi-layer woven fabric as shown in FIGS. 1 and 4, various colors and patterns (designs) are manifested. Between the face-side fabric 3 and the back-side fabric 4 as shown in FIGS. 1 and 4, the filling as exemplified in paragraph 0013 can be packed. The term "compartment" refers to a space surrounded by the face-side fabric 3 and the back-side fabric 4 as shown in FIGS. 1 and 4.

EXAMPLES

Our garment will be described in more detail with reference to Examples, but is not limited thereto. Various modifications and alterations are possible without departing from the technical scope of this disclosure. The performance of Example products and Comparative Example products was measured by the following methods.

(1) Fineness (dtex)

The fineness of a yarn was determined in accordance with JIS L 1013 (2010) 8.3.1 Method A, under a predetermined load of 0.045 cN/dtex.

(2) Air Permeability (cc/cm$^2$·sec)

Air permeability was determined in accordance with JIS L 1096 (2010) 8.27.1 Air permeability Method A (Frazier method). In the measurement of the fabric air permeability of each of the sewn products made of the double woven fabrics of Examples 1 and 2, a sample was mounted on the tester so that binding points in the double woven fabric contained in the laminated fabric were positioned at the center of the testing area. In the measurement of the fabric air permeability of each of the sewn products made of Comparative Examples 1 and 2, a sample was mounted on the tester so that the quilt seams were positioned at the center of the testing area.

(3) Moisture Permeability (g/m$^2$·24 hr)

Moisture permeability was determined in accordance with JIS L 1099 (2012) Method A-1. In the measurement of the fabric moisture permeability of each of the sewn products made of the double woven fabrics of Examples 1 and 2, a sample was mounted on the tester so that binding points in the double woven fabric contained in the laminated fabric were positioned at the center of the testing area. In the measurement of the fabric moisture permeability of each of the sewn products made of Comparative Examples 1 and 2, a sample was mounted on the tester so that the quilt seams were positioned at the center of the testing area.

(4) Water Pressure Resistance (mm H$_2$O)

Water pressure resistance was determined in accordance with the hydrostatic pressure method specified in JIS L 1092 (2009). In the measurement of the fabric's water pressure resistance of each of the sewn products made of the double woven fabrics of Examples 1 and 2, a sample was mounted on the tester so that binding points in the double woven fabric contained in the lamin-ated fabric were positioned at the center of the testing area. In the measurement of the fabric's water pressure resistance of each of the sewn products made of Comparative Examples 1 and 2, a sample was mounted on the tester so that the quilt seams were positioned at the center of the testing area.

(5) Weight (mg) of Down Coming Out of a Garment

The number of the down coming out of a garment was determined in accordance with KAKEN II Method developed by KAKEN TEST CENTER. Specifically, the down on the surface of a garment to be subjected to the test was carefully removed. Five rubber tubes for the pilling test specified in JIS L 1076 (2012) were wrapped in the garment. The garment was folded in half, and placed in a laundry net for a domestic washing machine. The laundry net holding the garment was placed in a tumble dryer with an internal filter that was previously cleaned, and five more rubber tubes for the pilling test specified in JIS L 1076 (2012) were placed in the tumble dryer. The tumble dryer was run at 50° C. for 30 minutes. Then, the garment was turned inside out, and five rubber tubes for the pilling test specified in JIS L 1076 (2012) were wrapped in the garment. The garment was folded in half, and placed in a laundry net for a domestic washing machine. The laundry net holding the garment was placed in the tumble dryer, and five more rubber tubes for the pilling test specified in JIS L 1076 (2012) were placed in the tumble dryer. The tumble dryer was run at 50° C. for 30 minutes. Then, the garment was taken out from the tumble dryer. The weight (mg) of the down on the garment and the weight (mg) of the down left inside the tumble dryer and the internal filter were measured. The sum of the weights of the down was taken as the weight (mg) of the down coming out of the garment. Each weight was measured with a known electronic balance with a lower measurement limit of 1 mg.

(6) Percent Stretch (%)

Percent stretch was determined in accordance with the fixed load method specified in JIS L 1096 (2010) Method B. In the measurement of the fabric's percent stretch of each of the sewn products made of the double woven fabrics of Examples 1 and 2, a sample was mounted on the tester so that binding points in the double woven fabric contained in the laminated fabric were positioned at the center of the testing area. In the measurement of the fabric's percent stretch of each of the sewn products made of Comparative Examples 1 and 2, a sample was mounted on the tester so that the quilt seams were positioned at the center of the testing area.

Example 1

Figure 5:
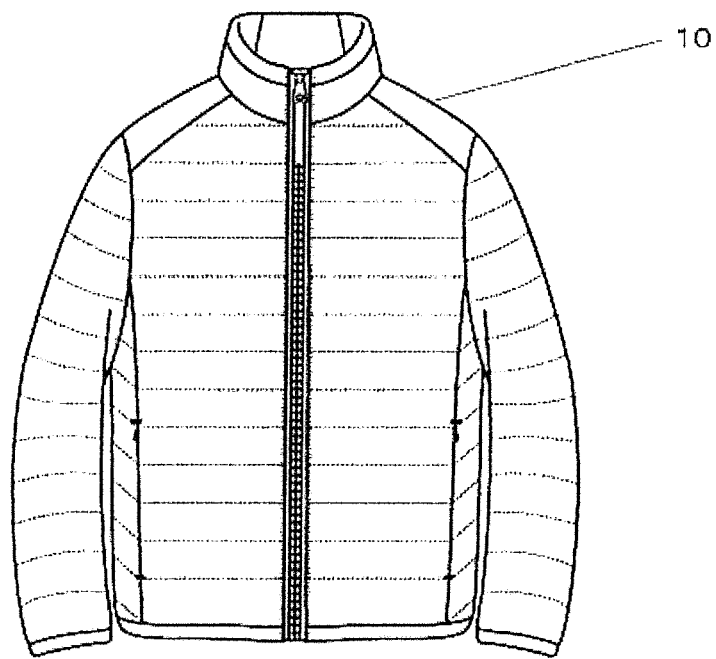
FIG. 5 is a front view of a down jacket produced in Examples and Comparative Examples.

A three-layer laminated fabric was produced containing the following. The first layer was a face fabric produced by weaving a nylon FDY of 22 dtex/24 f as warp and weft yarns at a warp density of 200 ends/2.54 cm and a weft density of 160 picks/2.54 cm. The second layer was a waterproof breathable membrane (polyurethane). The third layer was a double woven fabric of plain weave produced from two sets of warp yarns and two sets of weft yarns by weaving a nylon FDY of 22 dtex/24 f as the warp and weft yarns at a warp density of 400 ends/2.54 cm and a weft density of 400 picks/2.54 cm. Then, 50 g of down per m² of the fabric area was packed between the face-side fabric and the back-side fabric of the double woven fabric. The three-layer laminated fabric was made into a down jacket 10, as shown in FIG. 5, containing the face fabric, the waterproof breathable membrane and the double woven fabric. The down jacket was treated with water repellent finish using a fluorine-based water repellent. The garment (down jacket) of this Example was evaluated for air permeability (cc/cm²·sec), moisture permeability (g/m²·24 hr), water pressure resistance (mm $H_2O$), the weight (mg) of the down coming out of the garment and percent stretch (%), and the results are shown in Table 1 below. The down jackets produced in Example 2, Comparative Examples 1 and 2 were also treated with water repellent finish using the same fluorine-based water repellent.

Example 2

A four-layer laminated fabric was produced containing the following. The first layer was a face fabric produced by weaving a nylon FDY of 22 dtex/24 f as warp yarns and a single covered yarn made of a nylon DTY of 33 dtex/36 f and polyurethane fibers of 44 dtex as weft yarns at a warp density of 250 ends/2.54 cm and a weft density of 130 picks/2.54 cm. The second layer was a waterproof breathable membrane. The third layer was a double woven fabric of plain weave produced from two sets of warp yarns and two sets of weft yarns by weaving a nylon FDY of 22 dtex/24 f as the warp yarns and a single covered yarn made of a nylon DTY of 33 dtex/24 f and polyurethane fibers of 44 dtex as the weft yarns at a warp density of 300 ends/2.54 cm and a weft density of 300 picks/2.54 cm. The fourth layer was a lining fabric produced by applying acrylic coating to the whole surface of a fabric made by weaving a nylon FDY of 22 dtex/24 f as warp yarns and a single covered yarn made of a nylon DTY of 33 dtex/36 f and polyurethane fibers of 44 dtex as weft yarns at a warp density of 250 ends/2.54 cm and a weft density of 130 picks/2.54 cm. The four-layer laminated fabric was made into a down jacket 10 as shown in FIG. 5 containing the face fabric, the waterproof breathable membrane, the double woven fabric, the synthetic resin membrane and the lining fabric. The garment (down jacket) of this Example was evaluated for air permeability (cc/cm²·sec), moisture permeability (g/m²·24 hr), water pressure resistance (mm $H_2O$), the weight (mg) of the down coming out of the garment and percent stretch (%), and the results are shown in Table 1 below. The weight of the down was the same as that in Example 1.

Comparative Example 1

A fabric was produced by weaving a nylon FDY of 22 dtex/24 f as warp and weft yarns at a warp density of 200 ends/2.54 cm and a weft density of 160 picks/2.54 cm, and the fabric was laminated with a waterproof breathable membrane to produce a two-layer laminated fabric to be used as a face fabric. Another fabric was produced by weaving a nylon FDY of 22 dtex/24 f as warp and weft yarns at a warp density of 200 ends/2.54 cm and a weft density of 200 picks/2.54 cm, and the fabric was used as a lining fabric. The face fabric, the waterproof breathable membrane, down and the lining fabric were sewn together by quilting stitches arranged in the horizontal direction to produce a down jacket 10, as shown in FIG. 5. The garment (down jacket) of this Comparative Example was evaluated for air permeability (cc/cm²·sec), moisture permeability (g/m²·24 hr), water pressure resistance (mm $H_2O$), the weight (mg) of the down coming out of the garment and percent stretch (%), and the results are shown in Table 1 below. The weight of the down was the same as that in Example 1.

Comparative Example 2

A fabric was produced by weaving a nylon FDY of 22 dtex/24 f as warp yarns and a single covered yarn made of a nylon DTY of 33 dtex/36 f and polyurethane fibers of 44 dtex as weft yarns at a warp density of 250 ends/2.54 cm and a weft density of 130 picks/2.54 cm, and the fabric was laminated with a waterproof breathable membrane to produce a two-layer laminated fabric to be used as a face fabric. Another fabric was produced by weaving a single covered yarn made of a nylon DTY of 33 dtex/36 f and polyurethane fibers of 44 dtex at a warp density of 250 ends/2.54 cm and a weft density of 130 picks/2.54 cm. Then, the whole surface of the fabric was coated with acrylic coating and the fabric was used as a lining fabric. The face fabric, the waterproof breathable membrane, down and the lining fabric were sewn together by quilting stitches arranged in the horizontal direction to give a down jacket 10 as shown in FIG. 5. The garment (down jacket) of this Comparative Example was evaluated for air permeability (cc/cm²·sec), moisture permeability (g/m²·24 hr), water pressure resistance (mm $H_2O$), the weight (mg) of the down coming out of the garment and percent stretch (%), and the results are shown in Table 1 below. The weight of the down was the same as that in Example 1.

TABLE 1

| | Quilting stitches | Moisture permeability (g/m² · 24 hr) | Air permeability (cc/cm² · sec) | Water Pressure resistance (mm H₂O) | Percent stretch (%) | Weight of down coming out of garment (mg) |
|---|---|---|---|---|---|---|
| Example 1 | No | 12000 | 0.1 or less | 10000 | — | 1 or less |
| Example 2 | No | 10000 | 0.1 or less | 10000 | 20% | 5 |
| Comparative Example 1 | Yes | 15000 | 0.2 | 500 | — | 8 |
| Comparative Example 2 | Yes | 17000 | 0.2 | 500 | 20% | 20 |

As shown in Table 1, the garment of Example 1 had lower air permeability, a smaller weight of the down coming out of the garment and higher water pressure resistance compared to the garment of Comparative Example 1. The garment of Example 2 having stretchability had lower air permeability, a smaller weight of the down coming out of the garment and higher water pressure resistance compared to the garment of Comparative Example 2, which also had stretchability. The garments of Comparative Examples 1 and 2 had quilt seams and, due to this, had higher values of moisture permeability compared to the garments of Examples 1 and 2, but the moisture permeability values of Examples 1 and 2 are sufficient to ensure adequate moisture permeability. The values of the air permeability of Examples 1 and 2 were below the measurement limit and expressed as 0.1 or less in Table 1. The weight of the down coming out of the garment of Example 1 was also below the measurement limit and expressed as 1 or less in Table 1.

INDUSTRIAL APPLICABILITY

Our garment is suitable as outerwear such as cold weather clothing, and as bedclothes. Specifically, our garment can be used as down wear, down jackets, down coats, down vests, lap robes, futons, sleeping bags and the like.

The invention claimed is:

1. A garment comprising a multi-layer woven fabric comprising a face-side fabric, a back-side fabric, a filling packed between the face-side fabric and the back-side fabric, and a waterproof breathable membrane, wherein
the face-side fabric and the back-side fabric each have selvage ends and are woven together such that the face-side fabric and the back-side fabric are joined at the selvage ends to form the multi-layer woven fabric, and
the waterproof breathable membrane is provided on one surface of the multi-layer woven fabric, and
a small fineness of yarn comprising the face-side fabric and the back-side fabric is 11 dtex or more and 77 dtex or less.

2. The garment according to claim 1, further comprising a synthetic resin membrane on the other surface of the multi-layer woven fabric.

3. The garment according to claim 2, wherein the multi-layer woven fabric having the waterproof breathable membrane has an air permeability of 5 cc/cm²·sec or less.

4. The garment according to claim 2, wherein the multi-layer woven fabric having the waterproof breathable membrane has a water pressure resistance of 300 mm H₂O or more.

5. The garment according to claim 1, wherein the multi-layer woven fabric comprises a plurality of compartments.

6. The garment according to claim 5, wherein the multi-layer woven fabric having the waterproof breathable membrane has an air permeability of 5 cc/cm²·sec or less.

7. The garment according to claim 5, wherein the multi-layer woven fabric having the waterproof breathable membrane has a water pressure resistance of 300 mm H₂O or more.

8. The garment according to claim 1, wherein the multi-layer woven fabric having the waterproof breathable membrane has an air permeability of 5 cc/cm²·sec or less.

9. The garment according to claim 8, wherein the multi-layer woven fabric having the waterproof breathable membrane has a water pressure resistance of 300 mm H₂O or more.

10. The garment according to claim 1, wherein the multi-layer woven fabric having the waterproof breathable membrane has a water pressure resistance of 300 mm H₂O or more.

* * * * *